United States Patent [19]

Clemens

[11] Patent Number: 4,541,769
[45] Date of Patent: Sep. 17, 1985

[54] STACKER CRANE FORK MOUNTING SYSTEM

[75] Inventor: Gerald C. Clemens, Minneapolis, Minn.

[73] Assignee: Twin City Monorail, Hamel, Minn.

[21] Appl. No.: 514,513

[22] Filed: Jul. 18, 1983

[51] Int. Cl.⁴ .............................................. B65G 1/02
[52] U.S. Cl. .................................... 414/633; 414/283
[58] Field of Search .......................... 414/277, 280–284, 414/541, 542, 544, 628–633, 637, 662–672; 212/128, 129, 213

[56] References Cited

U.S. PATENT DOCUMENTS 3,061,111 10/1962 Riemschneider .................... 212/128
3,182,826  5/1965 Mutto ................................... 414/541

*Primary Examiner*—Robert G. Sheridan
*Attorney, Agent, or Firm*—John W. Adams

[57] ABSTRACT

A mounting system for stacker cranes designed for handling materials in warehouse storage racks which system includes a depending cylindrical crane supporting post member carried by a suitable overhead track and carriage support structure for permitting the supporting post member to be moved transversely and longitudinally with respect to the warehouse storage racks. The mounting system on the supporting post member includes a radial/thrust bearing mounted on the post which provides vertical and lateral support for the load, and roller means spaced axially along the post from the bearing to engage the outer cylindrical surface of the post to provide lateral support for the crane mounted on the post while permitting the crane to be rotated through an arc of 360° about the axis of the post, the system also including an electrical connection between the post and the crane to permit power to be provided to an electric power source mounted on the crane.

6 Claims, 6 Drawing Figures

STACKER CRANE FORK MOUNTING SYSTEM

BACKGROUND OF THE INVENTION

In the past, stacker cranes have been supported from the upper end of the vertically depending crane unit with the fork lift hoist mechanism mounted thereon. This upper supporting assembly includes an expensive plate and bearing component to provide the necessary lateral stability along with the required 360° rotation of the manually guided crane unit.

SUMMARY OF THE INVENTION

The present invention provides the 360° rotation along with the required lateral support by including a pair of spaced members; one being a vertical load-carrying radial/thrust bearing connected to the frame unit of the fork lift vertical supporting channels, along with a roller assembly for engaging the circumference of the depending post unit in vertically-spaced relation to the bearing to provide the lateral stability as well as the 360° manual rotation of the crane assembly. The improved mounting system is only a fraction of the cost of the prior art systems while providing improved stability and control for the crane assembly operator.

DETAILED DESCRIPTION OF THE INVENTION

Figure 1:
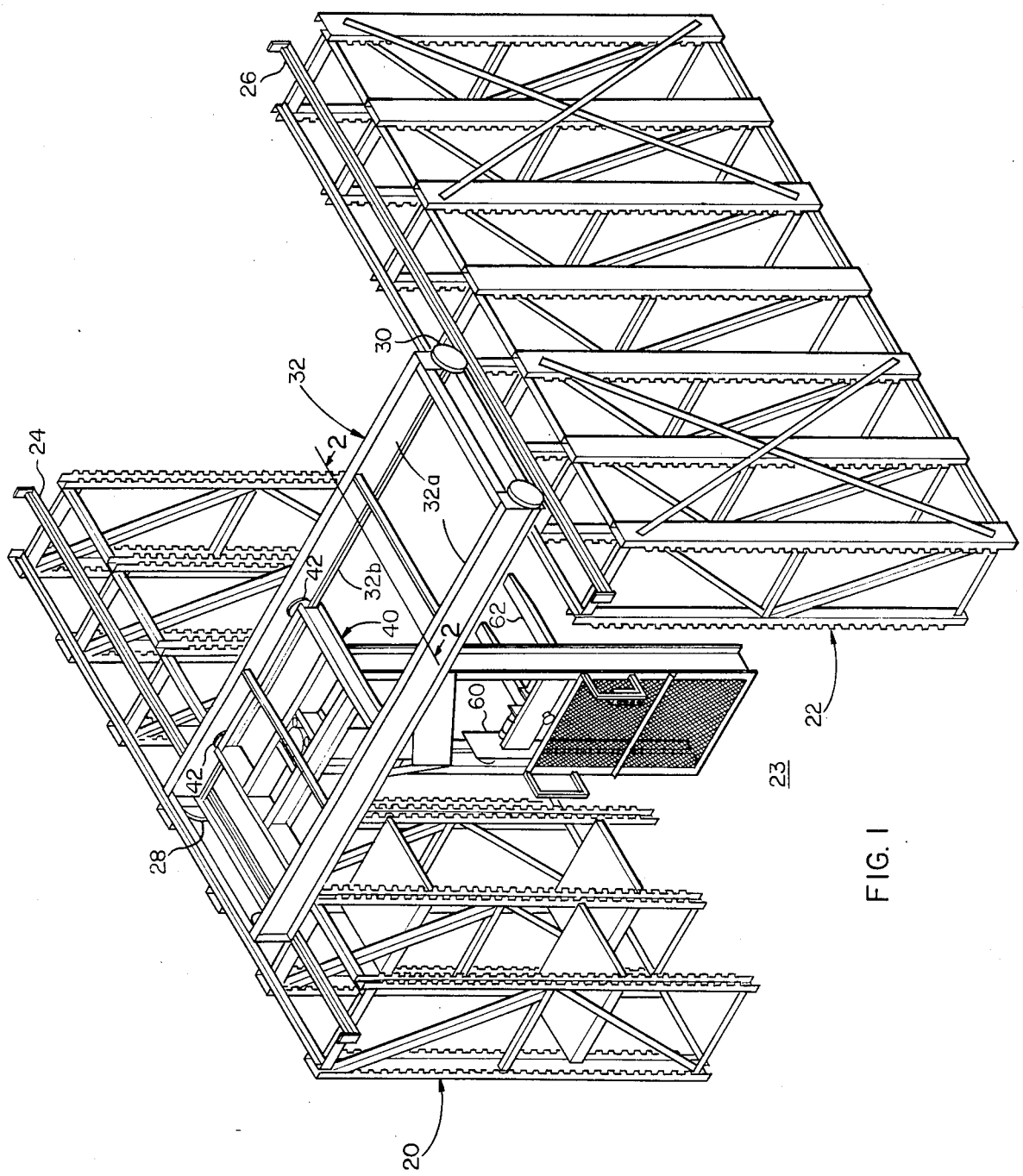
FIG. 1 is a perspective view showing my new mounting system embodied in a stacker crane of the type carried by a track supported on the warehouse storage bins.

FIG. 1 illustrates a pair of conventional warehouse storage racks respectively designated as entireties by the numerals 20 and 22 having an aisle 23 therebetween. In the system illustrated, a pair of longitudinal tracks 24 and 26 are respectively mounted on the top of the racks 20 and 22. Suitable rollers 28 and 30 are respectively mounted on the tracks 24 and 26 for supporting a cross frame structure 32. Cross members 32a provide suitable tracks 32b. A crane-supporting carriage 40 has rollers 42 journaled for rotation on the sides thereof and respectively mounted on the tracks 32b as illustrated for permitting the carriage to be moved back and forth between the racks 20 and 22.

A depending post member 45 is fixed to the carriage 40 and extends downwardly in depending relation therefrom. A crane unit 50 is supported by the post 45 and includes a pair of depending frame elements such as the channel members 52. The channel members 52 are rotatably mounted on the vertical axis of the post member 45 and are supported on said post member as by a radial/thrust bearing assembly 54 secured to a depending spindle 45a fixed to the lower end of the post 45. A mounting collar 54a is fixed to the depending spindle 45a as by set screws 54b and is positively locked against vertical displacement on the spindle by a nut 45b. A suitable radial/thrust bearing is journaled on the collar such as the ball bearing assembly 54c to permit rotation of the upper rotatable attachment flange 54d which is fixed to a suitable mounting bracket 52a as by the cap screws 54e. The mounting bracket 52a is fixed to the crane channel members 52 and provides the vertical and lower lateral support for the crane on the depending post 45 through the rotatable radial/thrust bearing assembly 54. The upper ends of the channel members 52 are rotatably mounted on the upper end of the cylindrical post member 45 as by a bracket 52b having two pairs of rollers 56 journaled on vertical spindles 56a fixed to said upper bracket 52b.

The crane assembly designated by the numeral 60 is of conventional design and includes a pair of lift fork elements 62 which are mounted for vertical movement on the upstanding channel members 52 as by the vertically-spaced roller elements 64 which travel on opposite sides of a guiding track 52c respectively fixed to the inside of the channel members 52 in a conventional manner.

The hoist unit 65 is a conventional mechanism such as is supplied by the Coffing Electric Chain Hoist Company having offices at P.O. Box 32605, Charlotte, N.C., 28232. The hoist unit 65 is supported from a bracket 51a which is mounted on the upper cross bars 51 which extend between the upper ends of the channel members 52 and the hoist 65 includes a hoist chain 65a which is connected to the crane 60 as by a hook 65b.

Figure 2:
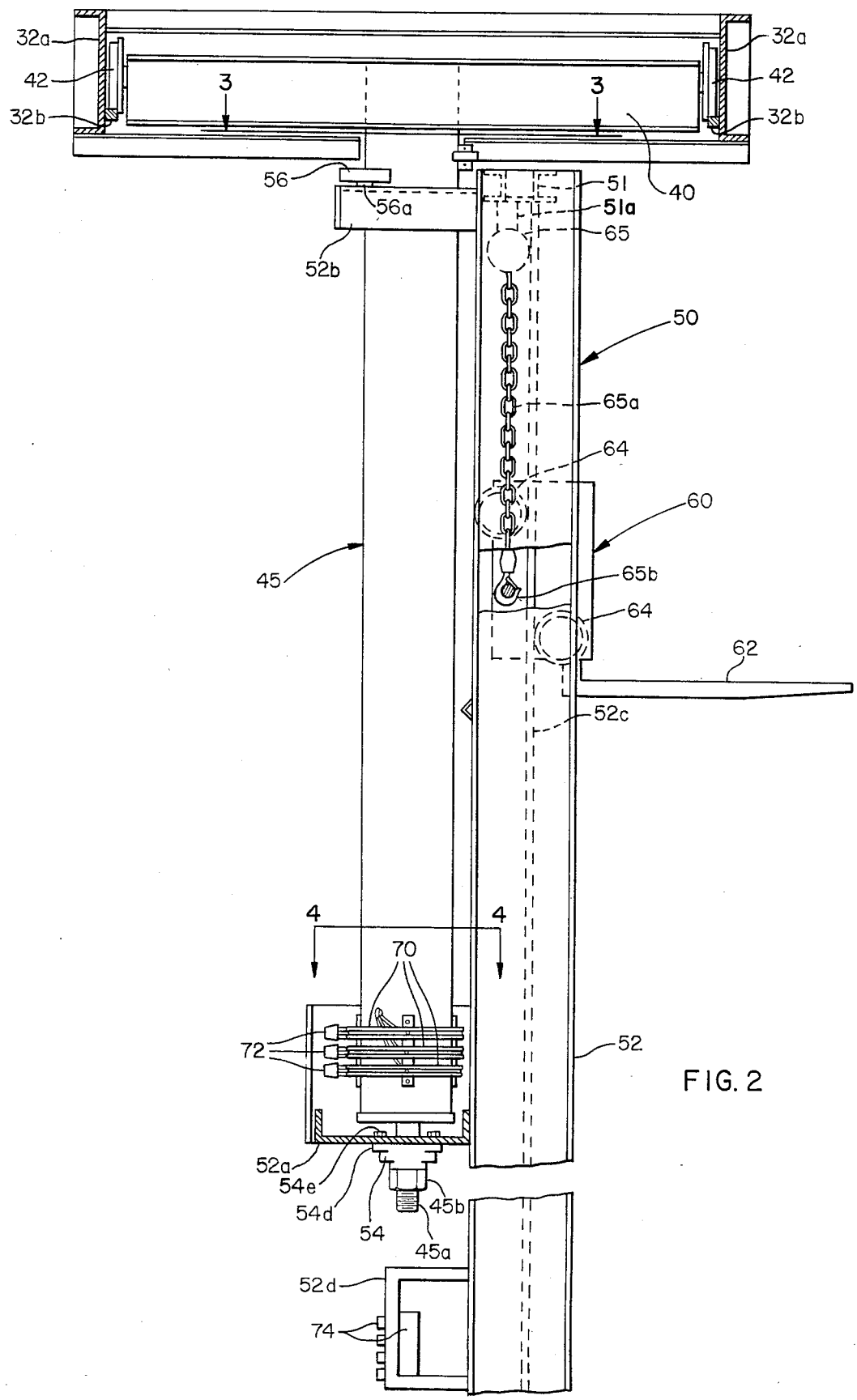
FIG. 2 is a sectional view taken substantially along the line 2—2 of FIG. 1 (with the fork in elevated position)
Figure 3:
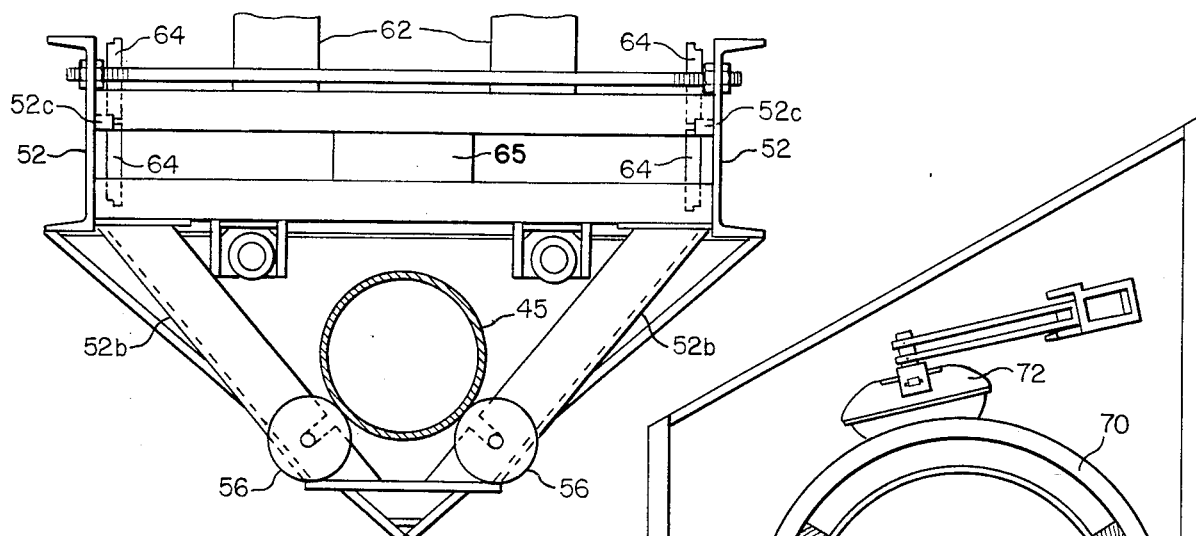
FIG. 3 is a horizontal sectional view taken substantially along the line 3—3 of FIG. 2.
Figure 4:
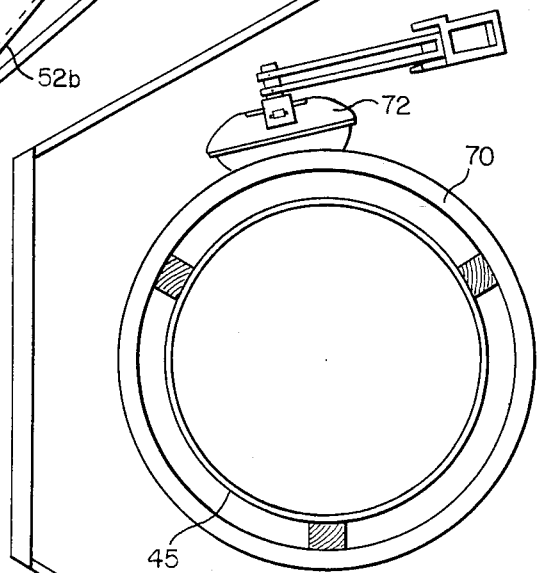
FIG. 4 is a horizontal sectional view taken substantially along the line 4—4 of FIG. 2.
Figure 5:
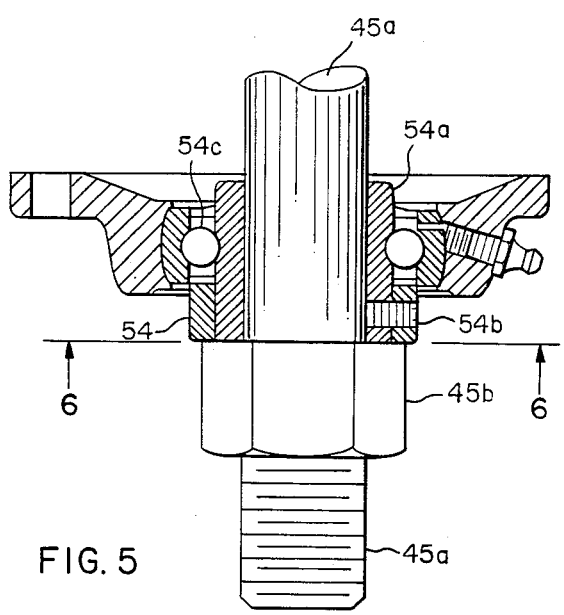
FIG. 5 is a vertical section taken through the thrust bearing assembly.
Figure 6:
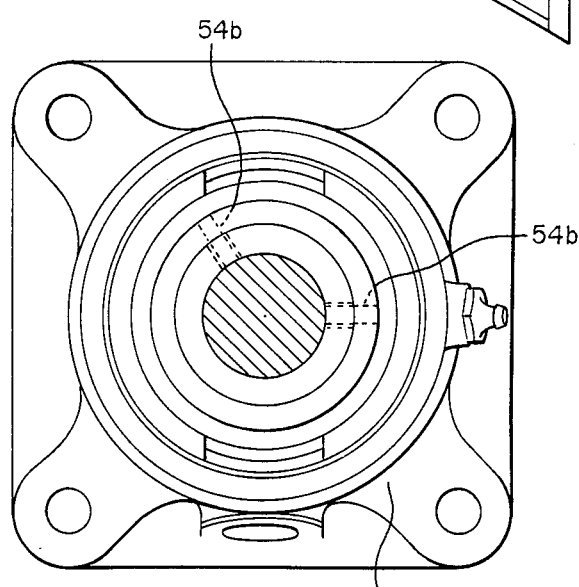
FIG. 6 is a horizontal sectional view taken substantially along the line 6—6 of FIG. 5.

Power for the chain hoist 65 is provided from the stationary conductor rings 70 fixed to the bottom of the depending post member 45. Suitable conductor shoes 72 are connected to the mounting bracket 52a fixed to the rotary crane unit 50 and have suitable electric cable connectors (not shown) to the chain hoist unit 65 through conventional control button assembly 74 best shown in FIG. 2.

It will be seen that this invention provides an extremely efficient, inexpensive mounting system for stacker cranes in which the vertical and lower lateral load is supported by a radial/thrust bearing assembly 54 mounted on the depending spindle 45a fixed to the depending supporting post member 45. Upper lateral support is provided by the rollers 56 which engage the upper portion of the outer circumference of the post member 45 and are connected to the upper ends of the crane channel members 52 as by the brackets 52b.

What is claimed is:

1. A mounting system for stacker cranes for handling materials in warehouse storage racks, comprising, a movable overhead carriage frame, a depending cylindrical supporting post member fixed to the frame, a radial/thrust bearing mounted on the bottom portion of the post, a crane assembly extending vertically below said post and laterally supported by the bearing for rotation thereon, roller means mounted on the top of said crane assembly and engaging the outer cylindrical surface of said post in vertically spaced relation above said radial/thrust bearing to provide lateral support for a load carried by the crane assembly to permit the load to be rotated through an arc of 360 about the axis of said post as a center line, said crane assembly including load-carrying means extending radially outwardly from one side of the post member, and power means mounted on said crane assembly for raising and lowering said load-carrying means.

2. The structure set forth in claim 1 wherein said radial/thrust bearing is mounted on a spindle fixed to the bottom of the depending post member.

3. The structure set forth in claim 2 and said roller means being spaced above said radial/thrust bearing and mounted on the opposite side of said post from the load-carrying means.

4. The structure set forth in claim 1 wherein said power means includes an electric hoist, an electric connection formed on said post member having a plurality of circumferential contact rings fixed to said post member, a contact shoe riding on each of said rings for making an electrical contact between the stationary rings and the circumferentially rotating shoe, said shoe being connected to the rotatable crane assembly and electrically connected to the electric hoist mechanism carried by said crane assembly for supplying electric current thereto, and control means mounted on said crane assembly for controlling the actuation of said hoist.

5. The structure set forth in claim 1 and said roller means comprising a pair of roller elements mounted on the top of said crane assembly and positioned in circumferentially spaced apart relation on the opposite side of said post from the load-carrying means.

6. The structure set forth in claim 1 wherein the outside diameter of the radial/thrust bearing is no larger than the diameter of the supporting post.

* * * * *